United States Patent
Adachi

(10) Patent No.: US 7,163,265 B2
(45) Date of Patent: Jan. 16, 2007

(54) CHILD CAR SEAT

(75) Inventor: Kinji Adachi, Tokyo (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 10/671,497

(22) Filed: Sep. 29, 2003

(65) Prior Publication Data

US 2004/0070246 A1 Apr. 15, 2004

(30) Foreign Application Priority Data

| Sep. 27, 2002 | (JP) | ............................ 2002-284215 |
| Sep. 27, 2002 | (JP) | ............................ 2002-284232 |
| Sep. 27, 2002 | (JP) | ............................ 2002-284246 |

(51) Int. Cl.
*A47D 1/10* (2006.01)

(52) U.S. Cl. ............................ 297/256.12; 297/250.1; 297/256.13; 297/256.16

(58) Field of Classification Search ............ 297/250.1, 297/256.12, 256.16, 344.21, 256.13, 253; 248/131, 415, 416, 425
See application file for complete search history.

(56) References Cited

U.S. PATENT DOCUMENTS

| 4,345,791 | A | * | 8/1982 | Bryans et al. .......... 297/256.14 |
| 4,762,364 | A | * | 8/1988 | Young .................... 297/256.12 |
| 4,936,629 | A | * | 6/1990 | Young .................... 297/256.12 |
| 4,971,392 | A | * | 11/1990 | Young .................... 297/256.12 |
| 5,183,312 | A | * | 2/1993 | Nania .................... 297/256.12 |
| 5,380,062 | A | | 1/1995 | Nania |
| 5,441,329 | A | * | 8/1995 | Janisch ................... 297/344.21 |
| 5,458,398 | A | * | 10/1995 | Meeker et al. ........... 297/250.1 |
| 5,478,135 | A | * | 12/1995 | Kain ...................... 297/256.16 |
| 5,611,596 | A | * | 3/1997 | Barley et al. ........... 297/256.13 |
| 5,716,095 | A | * | 2/1998 | Lopez ............... 297/256.16 X |
| 5,954,397 | A | * | 9/1999 | Czernakowski et al. . 297/250.1 |
| 6,000,753 | A | | 12/1999 | Cone, II |
| 6,017,088 | A | | 1/2000 | Stephens et al. |
| 6,139,101 | A | * | 10/2000 | Berringer et al. ........ 297/256.1 |
| 6,152,528 | A | * | 11/2000 | van Montfort .......... 297/250.1 |
| 6,193,312 | B1 | | 2/2001 | Yoshida et al. |
| 6,196,629 | B1 | * | 3/2001 | Onishi et al. .......... 297/256.12 |
| 6,241,314 | B1 | | 6/2001 | Pufall |
| 6,318,799 | B1 | | 11/2001 | Greger et al. |
| 6,428,100 | B1 | * | 8/2002 | Kain et al. ............. 297/256.16 |
| 6,439,660 | B1 | | 8/2002 | Guenther |
| 6,508,510 | B1 | * | 1/2003 | Yamazaki ................ 297/250.1 |
| 6,554,358 | B1 | * | 4/2003 | Kain ..................... 297/256.13 |
| 6,672,663 | B1 | * | 1/2004 | Kain ..................... 297/250.1 |

(Continued)

FOREIGN PATENT DOCUMENTS

DE 197 44 978 4/1999

(Continued)

*Primary Examiner*—Rodney B. White
*Assistant Examiner*—Stephen Vu
(74) *Attorney, Agent, or Firm*—Young & Thompson

(57) ABSTRACT

A child car seat comprises a base, and a seat main body supported by the base, in which the base is provided with a lower base portion mounted on a seat of a vehicle, and an upper base portion mounted so as to freely turn with respect to the lower base portion in such a manner as to reverse a direction with regard to a longitudinal direction of the vehicle, and having an upper surface to which the seat main body is mounted.

8 Claims, 14 Drawing Sheets

U.S. PATENT DOCUMENTS

| | | | |
|---|---|---|---|
| 6,672,664 B1 * | 1/2004 | Yanaka et al. | 297/256.16 |
| 6,692,073 B1 * | 2/2004 | Weathersby | 297/256.16 |
| 6,746,080 B1 * | 6/2004 | Tsugimatsu et al. | 297/256.13 |
| 7,032,966 B1 * | 4/2006 | Myers | 297/256.13 X |
| 7,059,676 B1 * | 6/2006 | McNeff | 297/250.1 |
| 2002/0084680 A1 | 7/2002 | Kain | |
| 2002/0163232 A1 * | 11/2002 | Vezinet et al. | 297/256.12 |

FOREIGN PATENT DOCUMENTS

| | | |
|---|---|---|
| DE | 101 04 137 | 8/2002 |
| EP | 0 302 607 | 2/1989 |
| EP | 0 732 235 | 9/1996 |
| EP | 0 853 018 | 7/1998 |
| EP | 1 110 807 | 6/2001 |
| EP | 1 145 898 | 10/2001 |
| FR | 02 680 734 | 3/1993 |
| JP | 10100760 | 4/1998 |
| JP | 2002-120617 | 4/2002 |

* cited by examiner

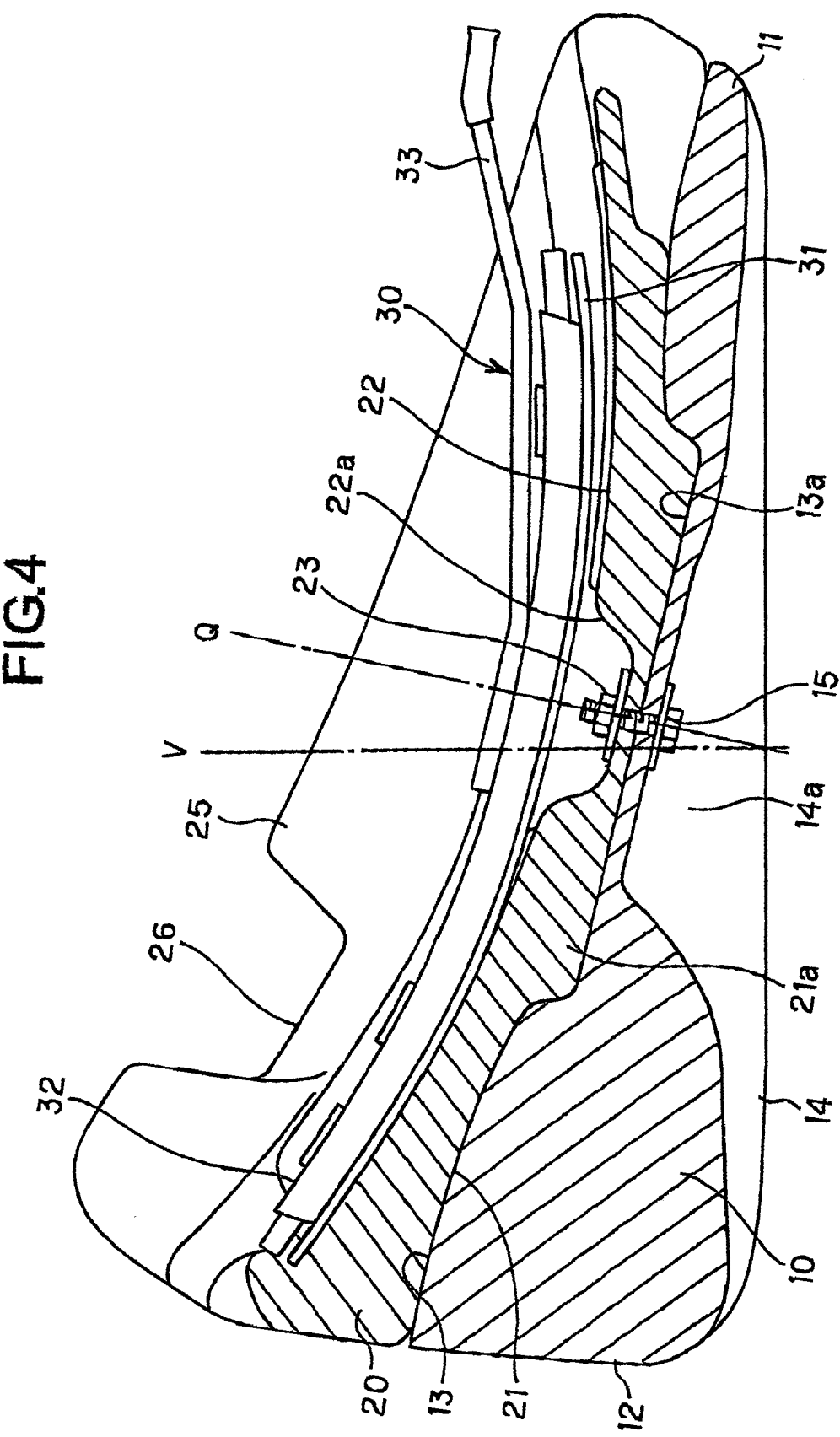

CHILD CAR SEAT

BACKGROUND OF THE INVENTION

1. Field of the Invention

The present invention relates to a child car seat.

2. Description of the Related Art

As a child car seat structured such that an orientation with respect to a longitudinal direction of a vehicle can be changed by turning a seat main body, there is known a child car seat provided with a base fixed to a seat of the vehicle via a seat belt, and a seat main body connected to the base via a seat turning mechanism and a reclining mechanism (refer, for example, to Japanese Patent Application Laid-Open No. 10-100760). The base may be called a pedestal, a cradle, a base plate and the like, however, in any case, the conventional base is only used as a base portion for fixing the child car seat to the seat, and for mounting fixed side parts of the turning mechanism and the reclining mechanism in the seat main body. There is no prior art in which the base itself includes a movable portion for applying a turning motion to the seat main body.

Further, as a device for fixing the base to the seat of the vehicle, there is known a belt fixing apparatus for fixing the seat belt and the base to each other by clamping the seat belt of the vehicle between a pair of cam-shaped members having unevenness on a surface thereof, and regulating the motion of the cam-shaped member in such a manner as to allow the seat belt to pass through in a fastening direction and prevent the seat belt from passing through in an opposite direction (a loosening direction) (refer, for example, to Japanese Patent Application Laid-Open No. 2002-120617).

However, in the child car seat in which the seat turning mechanism and the reclining mechanism are respectively provided between the base and the seat main body, it is necessary that both the mechanisms are provided in a limited space with no interference, and a great restriction exists in view of design, so that a structure of the connection portion between the base and the seat main body is complicated.

Further, in the child car seat in which the seat main body can be turned, the restraint condition of the child car seat with respect to the seat changes in correspondence to the orientation of the seat main body. In other words, in the case that the seat main body is set in a front-facing posture, since a back portion of the seat main body extends along a seat back of the seat of the vehicle, it is possible to bring the child car seat into contact with the seat back of the vehicle along a comparatively wide range so as to achieve a stable condition. However, in the case of setting the seat main body in a rear-facing posture, since a front end of the seat main body opposes to the seat back, there is a risk that the contact range between the child car seat and the seat back of the seat becomes narrower than that in the front-facing posture.

In order to prevent the disadvantage mentioned above, there is a case that a rod-shaped member extending upward along the seat back is mounted as an additional part to th base. However, it is troublesome to mount the additional part mentioned above, and it is necessary to carefully store after being demounted, so that this structure is troublesome.

Further, in a so-called baby seat used for an infant, in which the seat main body can be used as a carry by being demounted from the base, the same problem as mentioned above arises in the case that the base is provided with the additional part in the same manner so as to expand the contact range with the seat back of the seat in the vehicle.

Further, the belt fixing apparatus used in the conventional child car seat can clamp the seat belt only in one direction. On the other hand, in the vehicle provided with a general three-point seat belt, a direction in which a shoulder belt is fastened (a storing direction) is opposite between the case that the child car seat is placed in a right seat and the case that the child car seat is placed in a left seat. Accordingly, in the child car seat described in Japanese Patent Application Laid-Open No. 2002-120617 mentioned above, two belt fixing apparatuses are mounted to one seat belt in such a manner that the clamping directions thereof are opposite to each other.

However, in the case that a single child car seat is provided with a plurality of belt fixing apparatuses, the number of the parts and the assembling man-hour are increased, thus a cost increase is caused. A space required for arranging the belt fixing apparatuses is expanded, and a restriction in view of design is increased. In the case that the child car seat is mounted only to either of right and left sides, one belt fixing apparatus is wasted.

SUMMARY OF THE INVENTION

The present invention is achieved by taking the circumstances mentioned above into consideration, and a first object of the present invention is to provide a child car seat which can achieve a turning operation of a seat main body on the basis of a different structure from the conventional structure, and which can simplify a structure of a connection portion between the seat main body and a base.

Further, a second object of the present invention is to provide a child car seat which can improve the stability of the child car seat by expanding a contact range between the child car seat and a seat back of a seat in a vehicle without using any additional parts.

Further, a third object of the present invention is to provide a child car seat which can fix a seat belt only by using one belt fixing apparatus capable of clamping the seat belt only in one direction, even in the case that the seat belt fixing apparatus is placed in either of the right and left seats.

In accordance with the present invention for achieving the first object mentioned above, there is provided a child car seat comprising:

a base; and a seat main body supported by the base, wherein the base is provided with a lower base portion mounted on a seat of a vehicle, and an upper base portion mounted so as to freely turn with respect to the lower base portion in such a manner as to invert an orientation with respect to a longitudinal direction of the vehicle, and having an upper surface to which the seat main body is mounted.

In accordance with the child car seat, since the base itself is provided with a turning function, the seat turning mechanism is not necessarily provided between the base and the seat main body, and it is possible to simplify the structure of the connection portion between the both. For example, in the case that the seat main body is reclined with respect to the base, it is only sufficient that the reclining mechanism is provided between the base and the seat main body, so that a restriction in view of design of the reclining mechanism is reduced. In addition, in the case that any mechanism of applying some motion to the seat main body is provided in the base, the same effect is obtained. Further, since the lower base portion and the upper base portion are brought into contact with each other along a wide range without being affected by the connection portion between the base and the seat main body, it is possible to sufficiently secure a bearing area between a fixed side and a movable side of the turning motion so as to improve the stability of the turning portion, while the seat main body is structured such as to be capable of turning.

In the child car seat mentioned above in accordance with the present invention, the seat main body may be mounted on the upper base portion via a reclining mechanism. In this case, the structure may be made such that a shell of the seat main body and the upper base portion are connected further via the reclining mechanism, the base maybe provided with a bridge which is arranged so as to be astride the shell in a lateral direction while allowing a reclining motion of the shell with respect to the upper base portion and which has both ends fixed to the upper base portion, and a belt fixing apparatus for fixing the seat belt of the vehicle to the base may be mounted to the bridge. In this case, since the upper base portion is fixed by the seat belt of the vehicle, it is possible to suppress an impact from being transmitted to the turning mechanism between the lower base portion and the upper base portion. In the case that the belt fixing apparatus is structured such as to clamp the seat belt only in one direction, a single belt fixing apparatus can correspond to a change of the belt fastening direction by arranging the belt fixing apparatus in such a manner as to be vertically reversible on the bridge. In this case, regardless of existence of the reclining mechanism, the upper base portion may be provided with a belt mounting portion for fixing the upper base portion to the seat of the vehicle by the seat belt of the vehicle. The belt mounting portion in this case may be provided with a belt fixing apparatus for fixing the seat belt to the base. However, the upper base portion may be provided with a notch portion, a hook, a recess portion or the like for hooking the seat belt as the belt mounting portion without being provided with the belt fixing apparatus mentioned above, thereby preventing the seat belt from being slacked by a well-known slack-preventing device such as a clip or the like.

A center line of rotation of the upper base portion with respect to the lower base portion may be inclined so as to be displaced to a front side in the longitudinal direction in accordance with going to an upper side of the center line of rotation, in connection with a direction orthogonal to a lower surface of the lower base portion. In the case that the center line of rotation is inclined in the manner mentioned above, it is possible to increase a slant degree of a back portion in the seat main body in the case of mounting the seat main body in a rear-facing posture, in comparison with the case that the center line of rotation is made orthogonal to the base lower surface Further, the lower base portion may be formed in a shape in which the thickness is gradually increased from a front end in the longitudinal direction toward a rear end. In the case that the shape mentioned above is applied to the lower base portion, it is possible to cancel an upgrade of a seat surface of the vehicle by the lower base portion so as to recline the center line of rotation of the upper base portion to the front side.

Next, in accordance with a first aspect of the child car seat of the present invention for achieving the second object mentioned above, there is provided a child car seat comprising:

a base; and a seat main body supported by the base, and being invertible in an orientation with respect to a longitudinal direction of a vehicle, wherein a front end of a shell provided in the seat main body is allowed to be positioned on an approximately extension of a rear end of the base, at a time of setting the seat main body to a rear-facing posture.

In accordance with this child car seat, it is possible to expand a contact range in a vertical direction without using any additional parts, by simultaneously striking the rear end of the base and the front end of the shell against the seat back, in the case that the seat main body is set to the rear-facing posture. Accordingly, it is possible to improve the stability of the child car seat In the child car seat in accordance with the first aspect mentioned above, the structure may be made such that arm rest portions are provided on both sides of a seat portion in the shell, and the height of the arm rest portions with respect to the seat portion is gradually increased in accordance with being close to the front end. In this case, the length of the front end of the shell is expanded in a vertical direction, and an effect of improving the stability at a time of striking the front end of the shell against the seat back is further significantly achieved. Further, since the arm rest portion becomes higher in accordance with going to the front side, it is possible to securely protect a portion around knees from an impact applied from the side while securing a freedom of motion near elbows of a baby.

The arm rest portion of the shell may be provided with a belt through hole for putting the seat belt of the vehicle through to a front surface side of the shell in the case that the seat main body is set to the rear-facing posture. In this case, in the rear-facing posture, it is possible to extend the seat belt of the vehicle to the front surface side of the shell so as to firmly clamp the shell to the seat.

In accordance with a second aspect of the present invention for achieving the second object mentioned above, there is provided a child car seat comprising:

a base; and a seat main body provided so as to be detachable from the base, wherein the base is provided with a mounting portion for mounting the seat main body, and an expansion portion positioned close to a seat back side of a seat in a vehicle rather than the mounting portion and protruding upward in comparison with the mounting portion, and a rear end of the expansion portion functions as a contact portion with the seat back.

In accordance with the child car seat, it is possible to expand a contact range in a vertical direction between the base and the seat back without using any additional parts, by striking the expansion portion of the base against the seat back, in comparison with the case that the expansion portion is not provided. Accordingly, it is possible to improve the stability of the child car seat.

In the child car seat in accordance with the second aspect mentioned above, the structure may be made such that the expansion portion is provided with an inclined surface representing an upgrade from the mounting portion side toward the peak of the expansion portion, and the inclined surface may function as a belt mounting surface for mounting the seat belt of the vehicle. The belt mounting surface may be provided with a belt fixing apparatus for fixing the seat belt to the base. The belt mounting surface may be provided with a hook for inhibiting the seat belt from displacing upward.

Further, in the child car seat in accordance with the second aspect mentioned above, it is desirable that an inclination of the belt mounting surface is set such that an angle of inclination of the seat belt hooked to the belt mounting surface with respect to a horizontal surface is approximately 45 degrees, in the case of viewing the base from a side. In the case of setting the angle for hooking the seat belt to about 45 degrees, it is possible to prevent the seat belt from being slacked by pressing the base against the seat side by a shortest distance.

Next, in accordance with the child car seat of the present invention for achieving the third object mentioned above, there is provided a child car seat comprising:

a seat supporting portion to be clamped on a seat of a vehicle by a seat belt of the vehicle; and a belt fixing apparatus mounted to the seat supporting portion, allowing the seat belt inserted to an inner portion thereof to move in one direction and inhibiting the seat belt from moving to an opposite direction to the one direction, wherein the belt fixing apparatus is rotatably mounted to the seat supporting portion in such a manner that the one direction is invertible with respect to a lateral direction of the vehicle.

In accordance with this child car seat, it is possible to switch a corresponding relation between the lateral direction of the vehicle and the direction in which the belt fixing apparatus clamps the belt, by rotating the belt fixing apparatus. Accordingly, without reference to which of the right and left seats the child car seat is placed on, the child car seat can be clamped to the seat of the vehicle by fixing the seat belt and the seat supporting portion using the same belt fixing apparatus.

The child car seat for achieving the third object may be structured such that the child car seat is provided with a base provided as the seat supporting portion, and a shell provided so as to cover the base and mounted to the base in a state in which a reclining motion with respect to the base is possible, a bridge arranged so as to be astride the shell in a lateral direction from a front surface side while allowing a reclining motion of the shell and having both ends fixed to the base through the shell is provided on the base, and the belt fixing apparatus is mounted on the bridge. In accordance with the mounting structure, since the belt fixing apparatus can be operated from the front surface side of the shell even in the case that the base is covered by the shell, it is possible to easily carry out a fastening operation and a loosening operation of the seat belt.

In this case, a recess portion may be provided in the front surface side of the shell, and the bridge and the belt fixing apparatus may be received in the recess portion. In accordance with the structure mentioned above, it is possible to expose the belt fixing apparatus to the front surface side of the shell only at a necessary time by providing a suitable cover or a lid over the recess portion and it is possible to secure a continuity of the front surface of the shell at an unnecessary time by closing the recess portion.

The child car seat for achieving the third object may be structured such that the child car seat is provided with a base provided as the seat supporting portion, and a seat main body provided so as to be detachable with respect to the base, and the belt fixing apparatus is mounted to the portion of the base covered by the seat main body. For example, in the child car seat for the infant, which is called a baby seat, the seat main body can be detachable with respect to the base for the purpose of using the seat main body as a carry. With respect to the child car seat having the structure mentioned above, the belt fixing apparatus is exposed by detaching the seat main body, whereby it is possible to carry out a fastening operation and a loosening operation of the seat belt. Accordingly, it is not necessary to independently employ a structure for exposing the belt fixing apparatus to the front surface side of the seat main body, and it is possible to simplify the structure.

In the child car seat for achieving the third object, it is desirable that the belt fixing apparatus is arranged in a center with respect to the lateral direction. In the case that the belt fixing apparatus is arranged in the center in the lateral direction, it is possible to fix the seat belt uniformly by the belt fixing apparatus even when the seat belt is mounted from either of the right and left sides.

BRIEF DESCRIPTION OF THE DRAWINGS

FIG. 4 is a vertical cross sectional view along a longitudinal direction of the base;

DESCRIPTION OF THE PREFERRED EMBODIMENT

Figure 1:
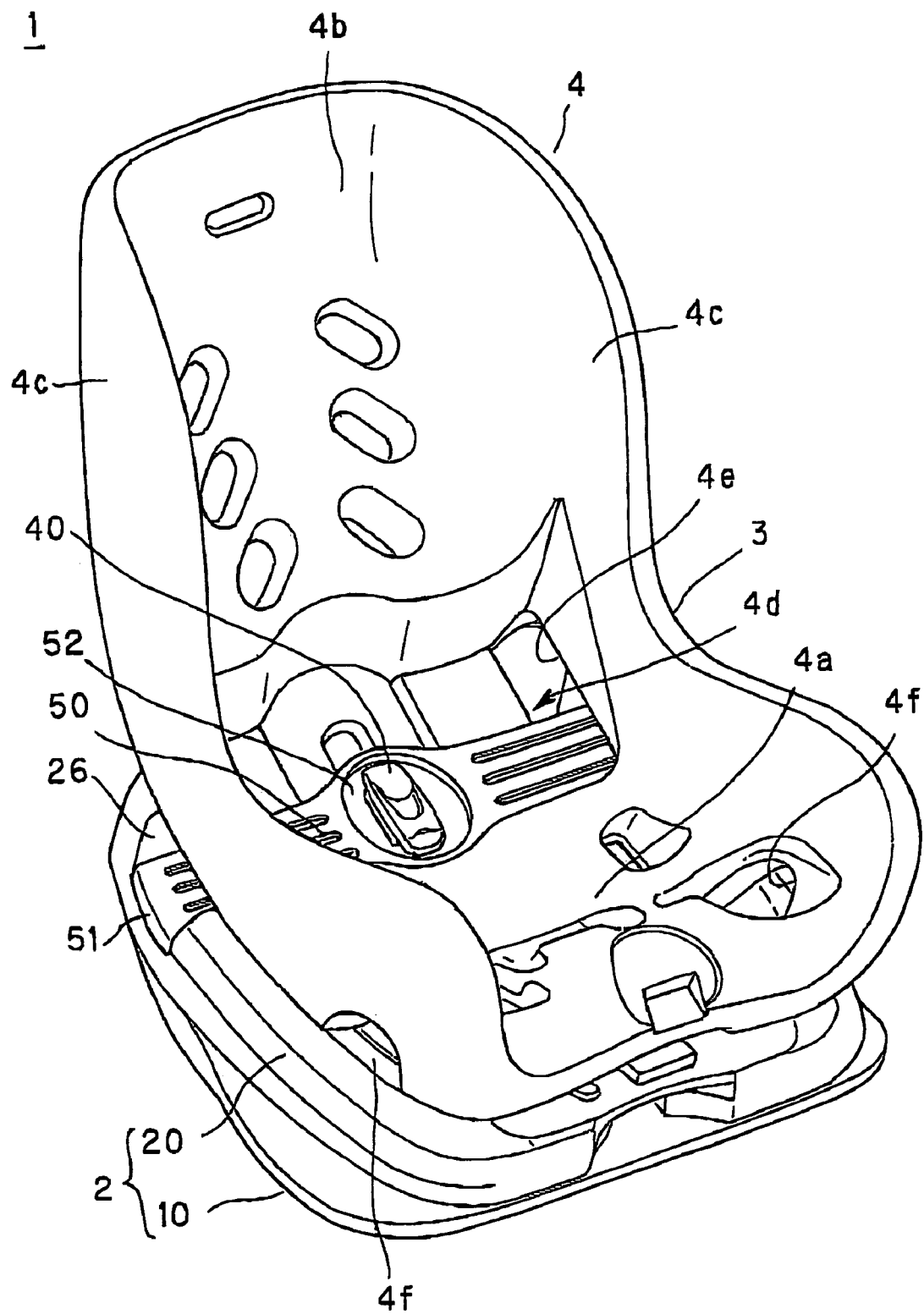
FIG. 1 is a perspective view of a child car seat in accordance with an embodiment of the present invention.

FIG. 1 shows a child car seat in accordance with an embodiment of the present invention. The child car seat 1 is provided with a base 2, and a seat main body 3 supported by the base 2. The seat main body 3 is provided with a hard resin shell 4 in which a seat portion 4a, a back portion 4b, and side wall portions 4c and 4c are integrally formed. Various accessories such as a belt harness, a belt regulating mechanism, a skin material and the like are mounted to the shell 4, however, in this case, an illustration of those accessories is omitted.

Figure 2:
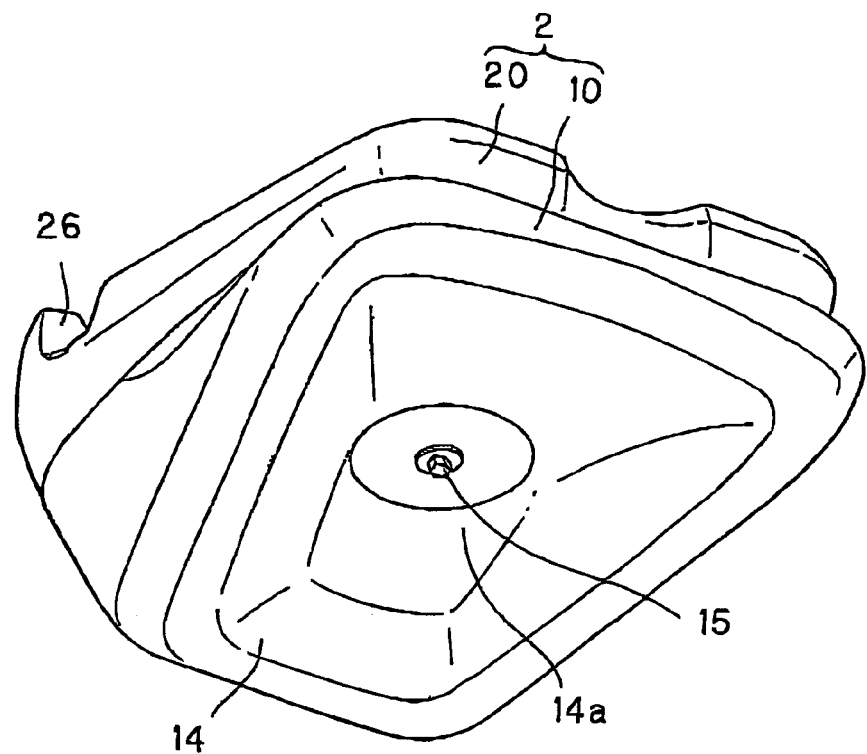
FIG. 2 is a perspective view of a lower surface side of a base.
Figure 3:
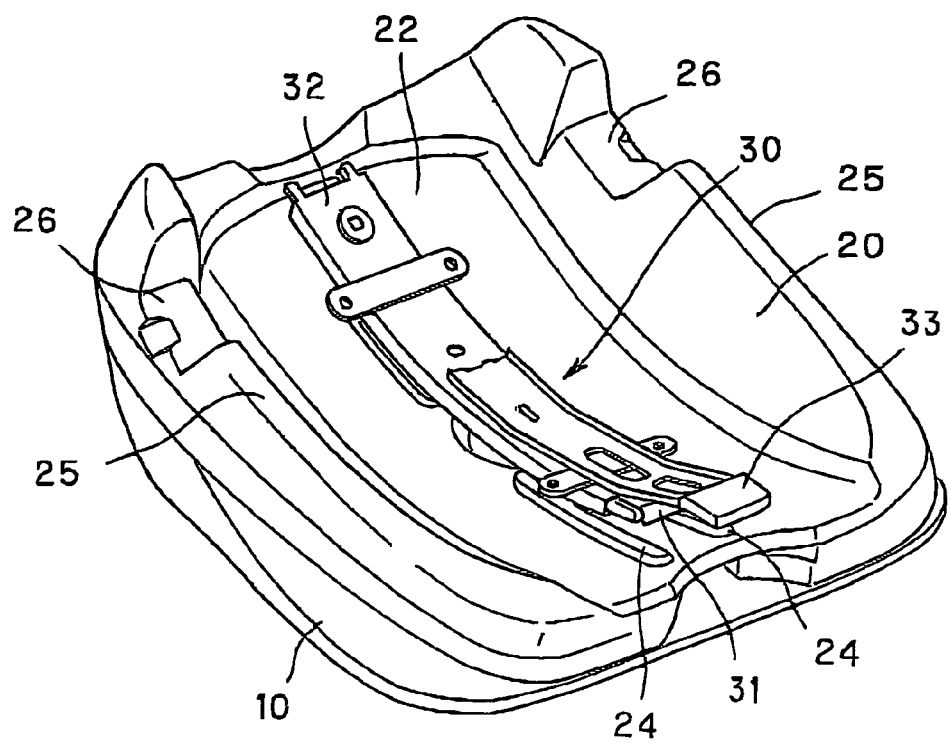
FIG. 3 is a perspective view of an upper surface side of the base.

As shown in FIGS. 2 to 4, the base 2 is provided with a lower base portion 10 and an upper base portion 20. Each of the base portions 10 and 20 is molded by a resin. As is well shown in FIG. 4, the lower base portion 10 is formed in a wedge shape in which the thickness is increased from a front end 11 thereof toward a rear end 12 thereof. Recess portions 13a and 14a are respectively formed in centers of upper and lower surfaces 13 and 14 in the lower base portion 10. The recess portion 13a close to the upper surface 13 is depressed approximately in a circular shape, and a boss 21a provided in a lower surface 21 of the upper base portion 20 is fitted to the recess portion 13a.

A recess portion 22a is formed on an upper surface 22 of the upper base portion 20 in correspondence to the boss 21a. A connection bolt 15 is attached to the recess portion 14a of the lower base portion 10, and the connection bolt 15 passes through the base portions 10 and 20 and is screwed into a nut 23 within the recess portion 22a. Accordingly, the upper and lower base portions 10 and 20 are connected so as to freely turn around the connection bolt 15. Therefore, as shown in FIGS. 5A to 5C, it is possible to turn the upper base portion 20 with respect to the lower base portion 10 so as to invert a direction of the upper base portion 20 in a longitudinal direction of a vehicle (a lateral direction in FIG. 4).

Figure 5A:
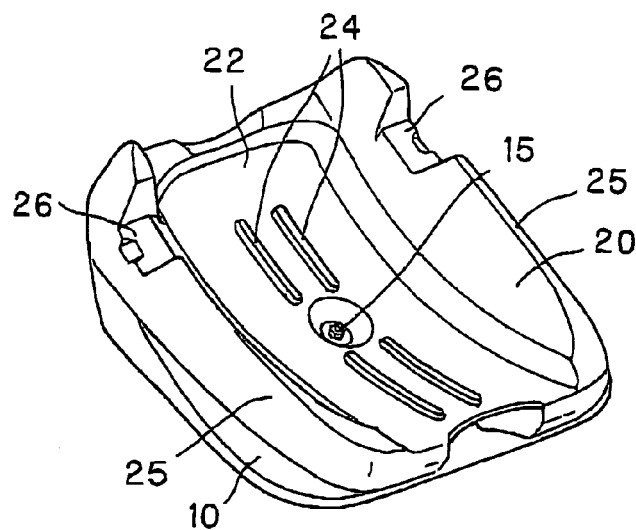
FIGS. 5A to 5C are perspective views showing a turning motion of an upper base portion.
Figure 5B:
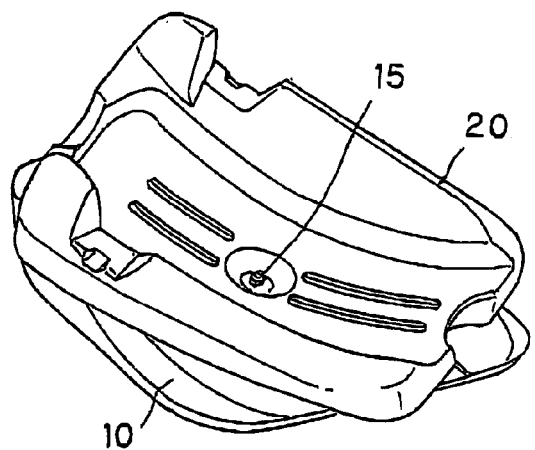
Figure 5C:
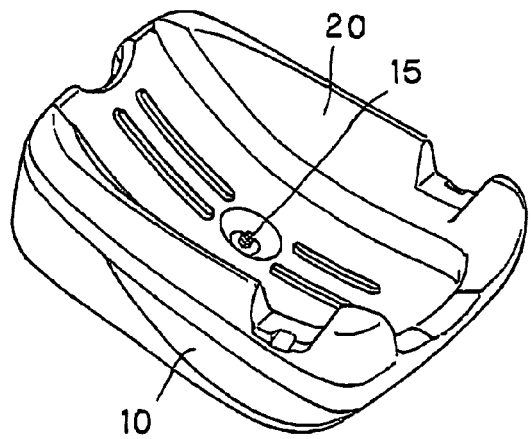

In this case, in order to suitably clamp the upper base portion 20 at positions in FIGS. 5A and 5C, it is preferable that a positioning device such as a boss and a recess portion respectively fitting at positions in FIGS. 5A and 5C are provided between the upper surface 13 of the lower base portion 10 and the lower surface 21 of the upper base portion 20. In the case that the positioning device mentioned above is provided, it is desirable that a suitable room is provided between the connection bolt 15 and the nut 23, and the fitting of the positioning device can be cancelled by lifting up the upper base portion 20 with respect to the lower base portion 10. Further, it is desirable to attach a coil spring or the like between the connection bolt 15 and a bottom surface of the recess portion 14a under a compressed state, thereby regulating a play of the connection bolt 15 caused by the room between the connection bolt 15 and the nut 23.

As is apparent from FIGS. 4, and 5A to 5C, the upper surface 22 of the upper base portion 20 extends in the longitudinal direction while describing an arc bulging downward. A pair of right and left protruding stripe portions 24 and 24 is formed in a center portion of the upper surface 22 in a lateral direction. A center line (a turning center line) Q of the connection bolt 15 is inclined with respect to a perpendicular line V of the lower surface 14 of the lower base portion 10 in such a manner that an upper side of the center line Q is larger displaced close to the front end 11 of the lower base portion 10. A thickness from the lower surface 21 of the upper base portion 20 to an upper surface of the protruding stripe portion 24 (hereinafter, referred to as a basic thickness of the upper base portion 20) is increased in accordance with going apart from the turning center line Q. A change in the basic thickness of the upper base portion 20 is approximately symmetrical in a longitudinal direction (a lateral direction in FIG. 4) with respect to the turning center line Q, however, may be set asymmetrical.

Figure 6:
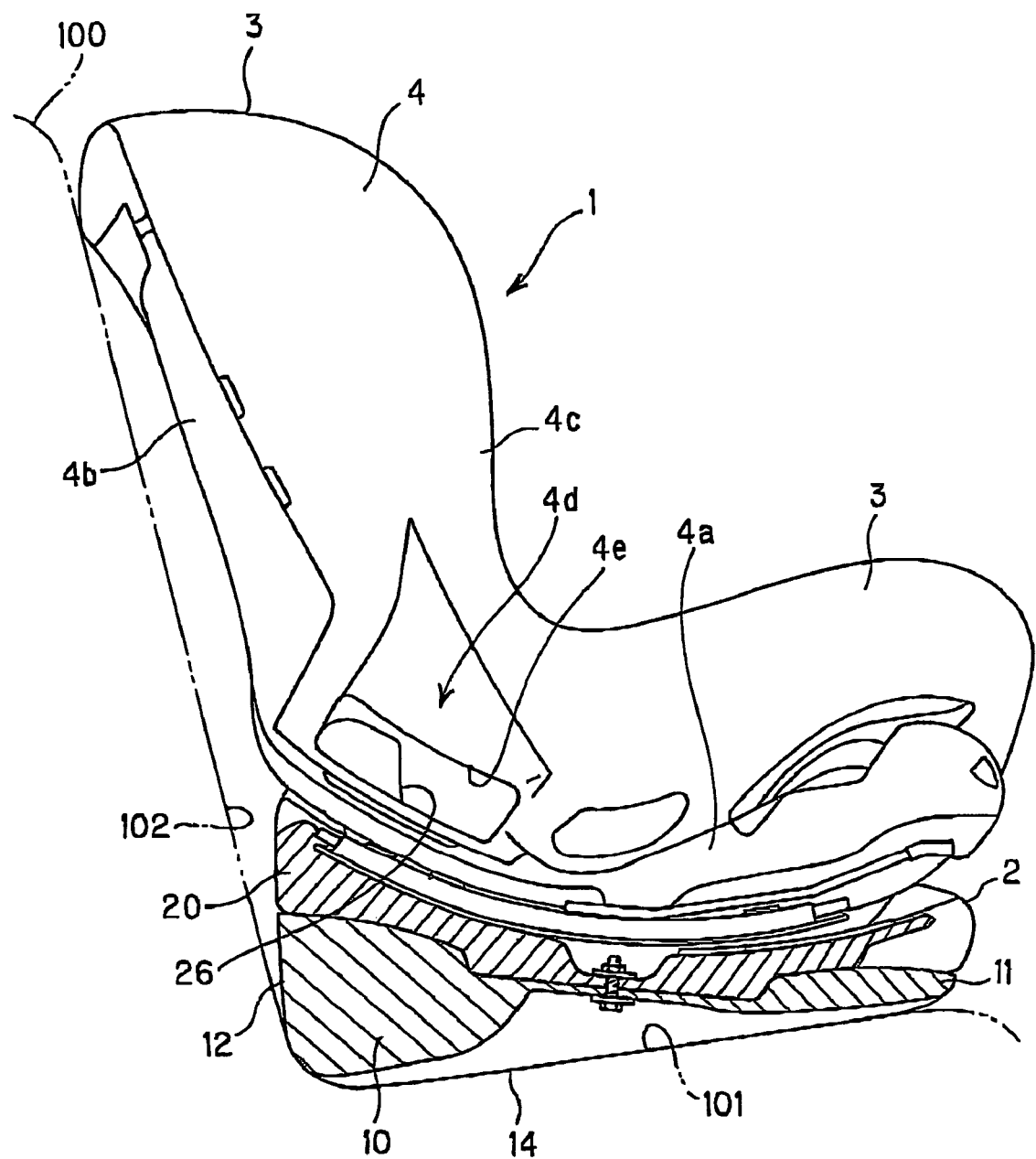
FIG. 6 is a vertical cross sectional view along a longitudinal direction in a state in which a seat main body is mounted to the base.

A fixed side rail 31 of a reclining mechanism 30 shown in FIG. 3 is fixed to the protruding stripe portions 24 of the upper base portion 20. The fixed side rail 31 is curved along the protruding stripe portions 24, and a movable side rail 32 is mounted to an upper side thereof so as to be slidable along a longitudinal direction (a curving direction). The movable side rail 32 is clamped onto the fixed side rail 31 by a suitable clamp device, for example, a clamping mechanism utilizing its own spring effect. A lever 33 is mounted to the movable side rail 32. The clamp of the movable side rail 32 achieved by the clamp device can be cancelled by lifting up a leading end portion of the lever 33, whereby the movable side rail 32 can move along the fixed side rail 31. Further, the movable side rail 32 is fixed to the shell 4 as shown in FIG. 6. Accordingly, it is possible to move the shell 4 along the curve of the fixed side rail 31 so as to recline the seat main body 3.

As shown in FIG. 6, the base 2 is mounted to a seat 100 in a state in which the rear end 12 of the lower base portion 10 is directed to a side of a seat back 102 while the lower surface 14 of the lower base portion 10 is closely attached to a seat surface 101 of the seat 100 in the vehicle. Accordingly, an orientation of the seat main body 3 can be inverted between a front-facing posture shown in FIG. 7A, and a rear-facing posture shown in FIG. 7B, by turning the upper base portion 20 with respect to the lower base portion 10.

As mentioned above, the thickness of the lower base portion 10 is increased in accordance with going close to the rear end 12, and the turning center line Q of the upper base portion 20 is inclined with respect to the direction orthogonal to the lower surface 14 of the lower base portion 10 Therefore, in comparison with the case that the turning center line Q is set to be in parallel to a normal line direction of the lower surface 14, it is possible to set the inclination of the back portion 4b in the rear-facing posture (FIG. 7B) from the vertical direction to be large. In other words, in general, an upgrade from a rear end toward a front end is applied to the seat surface 101 of the vehicle. Accordingly, in the case that the turning center line Q is provided in parallel to the normal line direction of the base lower surface 14, the back portion 4b tends to be in an uprising state in the rear-facing posture in comparison with the front-facing posture. On the contrary, in the case that the turning center line Q is inclined as mentioned above, the back portion 4b in the rear-facing posture is going to largely recline in a horizontal direction. Further, it is possible to largely recline the back portion 4b as shown by an imaginary line in FIG. 7B by utilizing a reclining mechanism 30. In this case, depending on the angle of the seat surface 101, it is desirable that the turning center line Q is inclined such that an upper side of the turning center line Q is displaced forward in comparison with a lower side thereof, in a state of being mounted to the vehicle.

Next, a description will be given of a structure for fixing the child car seat 1 to the seat 100 by utilizing the seat belt of the vehicle. As shown in FIG. 1, a belt fixing apparatus 40 is provided near a boundary between the seat portion 4a and the back portion 4b in the shell 4. In this case, the belt fixing apparatus 40 is not fixed to the shell 4, and is supported by the upper base portion 20 via a bridge 50.

Figure 7A:
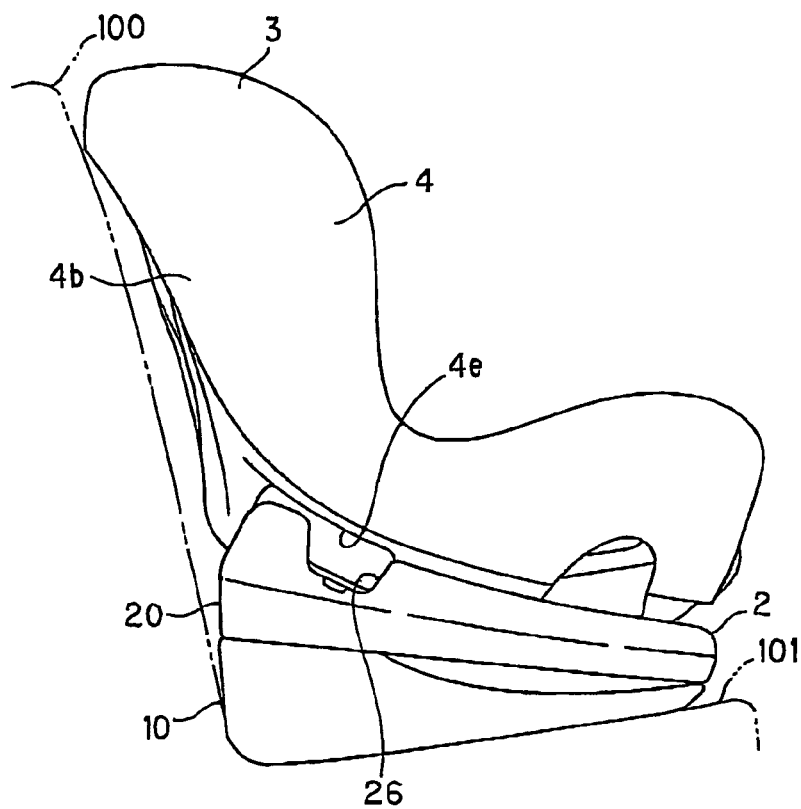
FIGS. 7A and 7B are views showing a state in which the facing direction of the seat main body is longitudinally changed.
Figure 8:
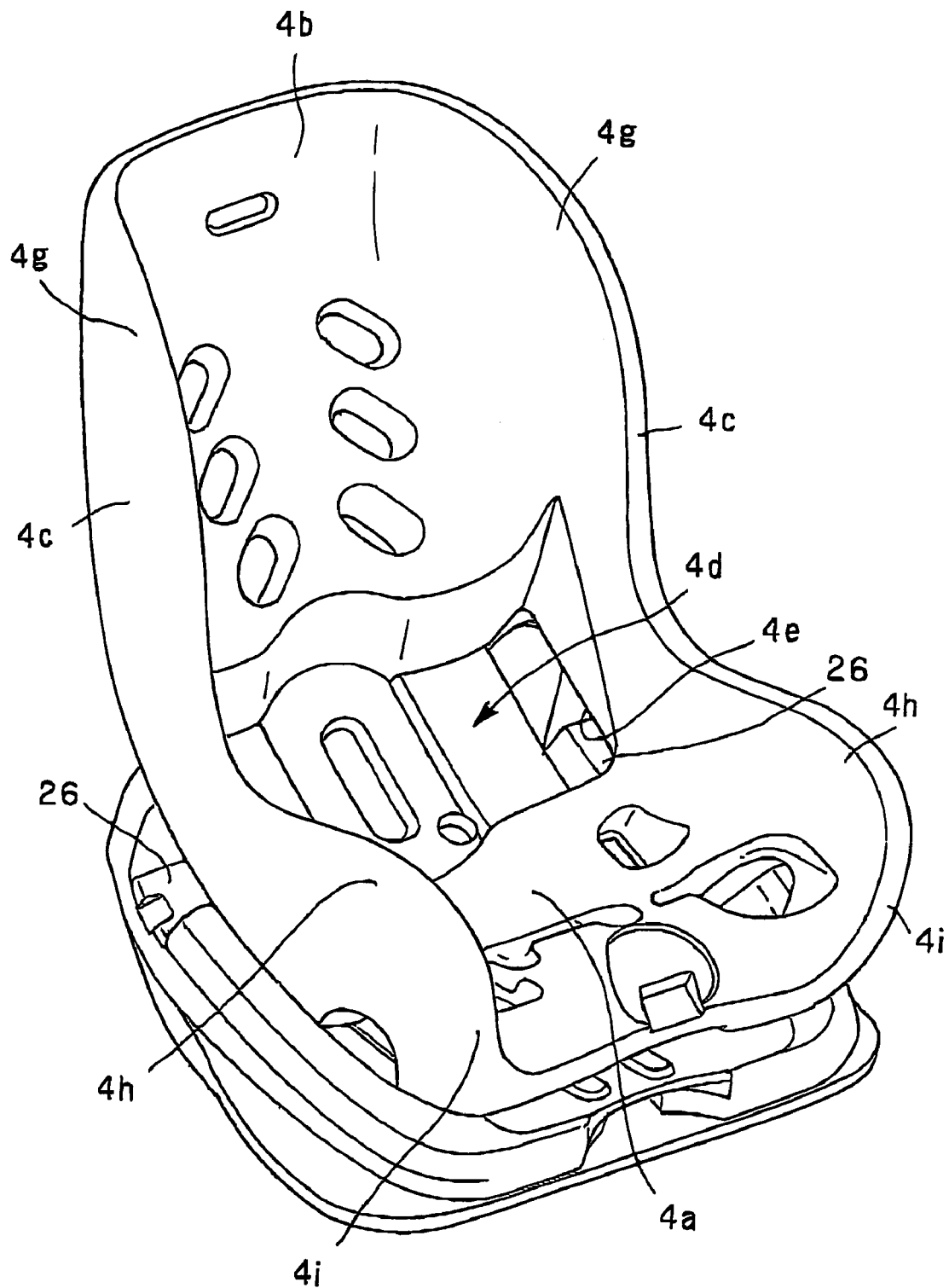
FIG. 8 is a view showing a state in which a belt fixing apparatus and a bridge for mounting the belt fixing apparatus are taken off from the structure in FIG. 1.

FIG. 6 is a cross sectional view of a state in which the bridge 50 is taken off, and FIG. 8 is a perspective view corresponding thereto. As is apparent from these drawings, a recess portion 4d for mounting the bridge is formed near a boundary between the seat portion 4a and the back portion 4b in the shell 4, and a belt through hole 4e for inserting and passing the seat belt therethrough is formed in the side wall portion 4c in such a manner as to communicate with the recess portion 4d. On the other hand, as is well shown in FIGS. 3 and 4, a notch portion 26 is formed in each of side wall portions 25 and 25 of the upper surface 22 in the upper base portion 20. Further, as shown in FIGS. 6 and 7A, a position of the notch portion 26 of the side wall portion 25 is in line with a position of the belt through hole 4e as seen from a lateral direction of the child car seat 1.

After the shell 4 and the upper base portion 20 are connected via the reclining mechanism 30, a bridge 50 is arranged in the recess portion 4d of the shell 4 as shown in FIG. 1. Both end portions 51 and 51 of the bridge 50 are fitted to the notch portions 26 of the upper base portion 20 through the belt through hole 4e, whereby the bridge 50 is bridged between the side wall portions 25 and 25 of the upper base portion 20 so as to be astride the shell 4. Further, the bridge 50 and the upper base portion 20 are fixed to each other by a fixing device (not shown) in such a manner that both end portions 51 of the bridge 50 do not come off from the notch portions 26. In this case, in order to recline the shell 4 with respect to the upper base portion 20 without being interfered by the bridge 50, the length of the belt through hole 4e in the longitudinal direction is secured to be sufficiently wider than the bridge 50.

Figure 9:
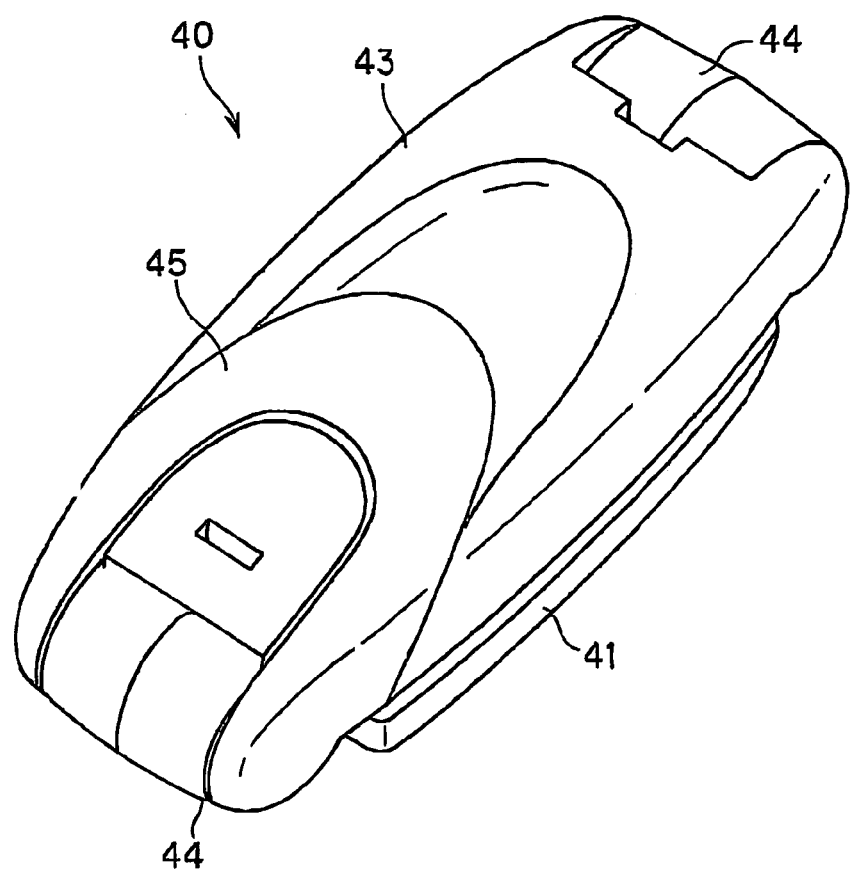
FIG. 9 is a perspective view of the belt fixing apparatus.
Figure 10:
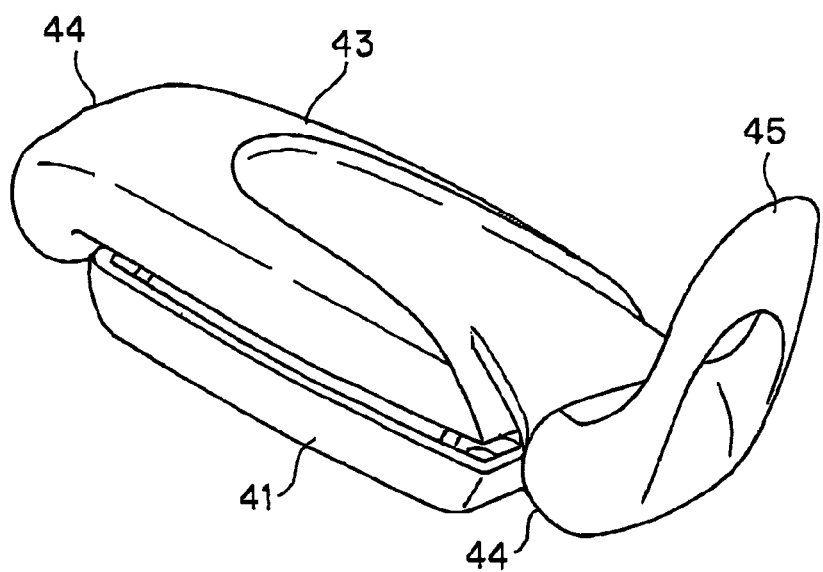
FIG. 10 is a perspective view of the belt fixing apparatus in a state in which a clamper is opened.
Figure 11:
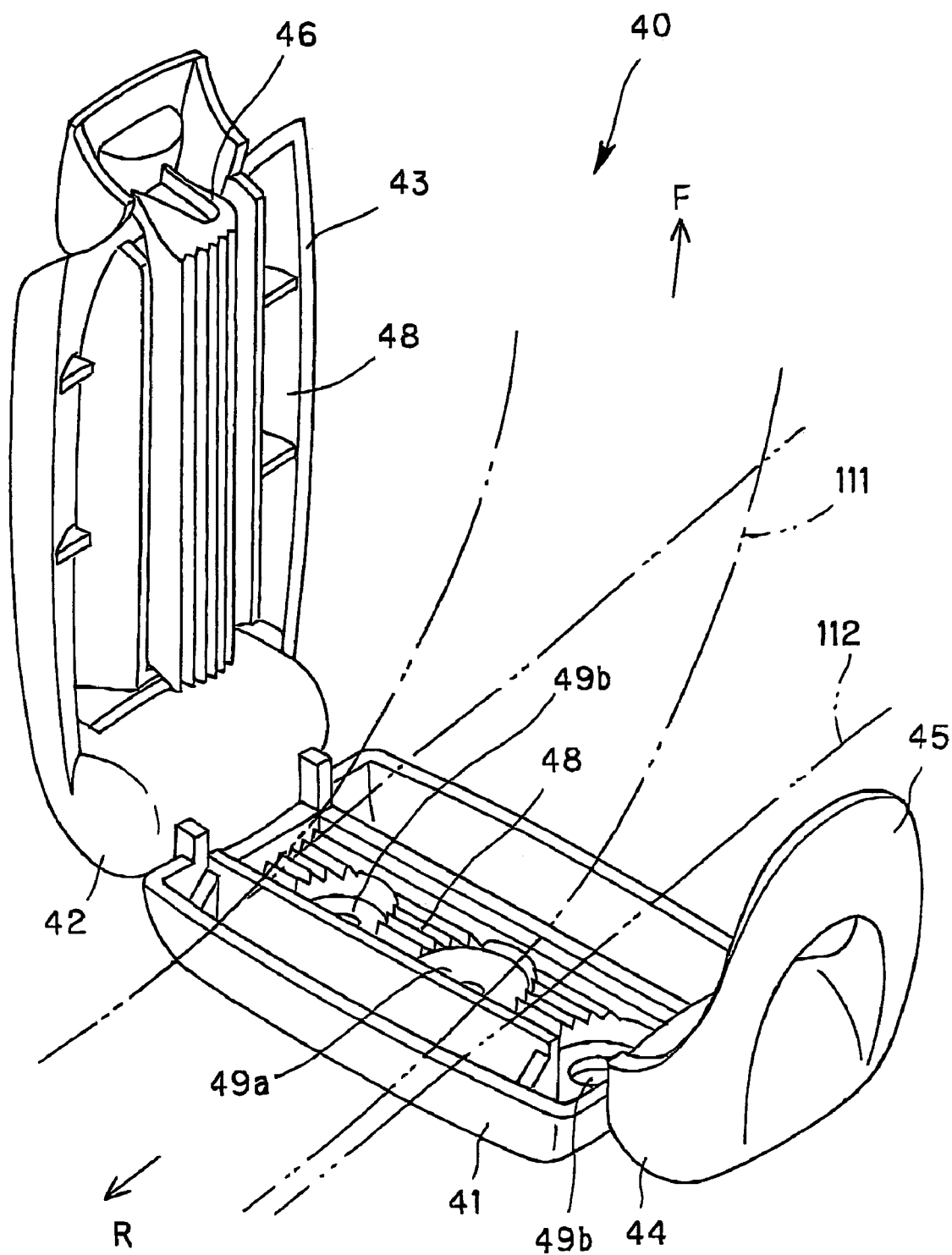
FIG. 11 is a perspective view showing an internal structure of the belt fixing apparatus.
Figure 12:
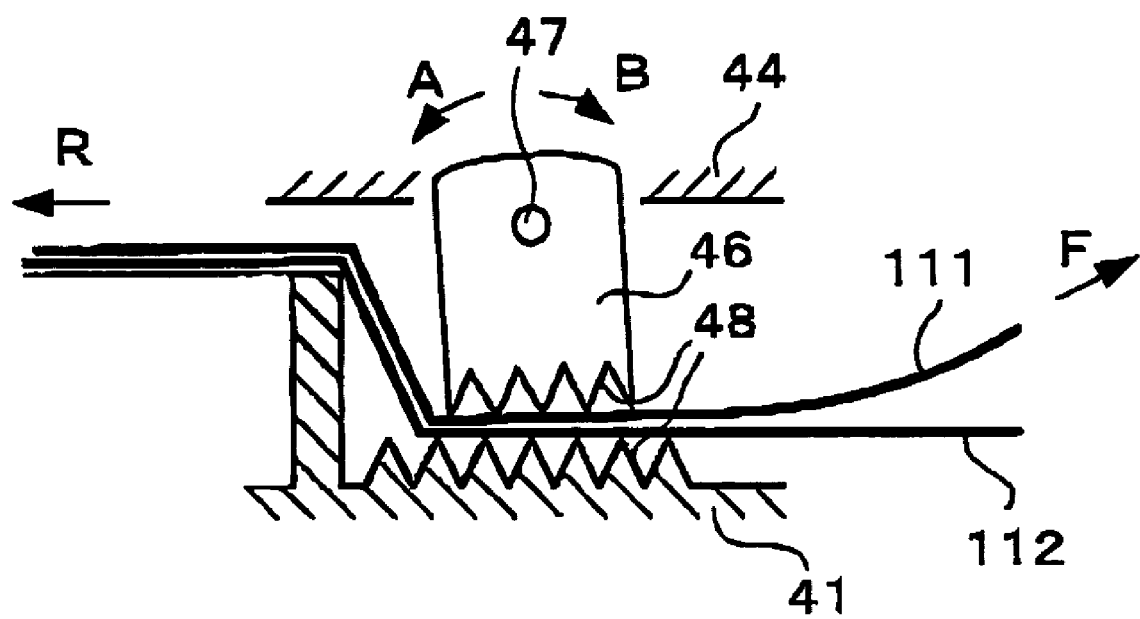
FIG. 12 is a view showing an operation of the belt fixing apparatus.

FIGS. 9 to 11 show details of the belt fixing apparatus 40. As shown in these drawings, the belt fixing apparatus 40 is provided with a main body case 41, a damper 43 provided in one end of the main body case 41 via a hinge 42 so as to be freely opened and closed, and a lock 45 provided in another end of the main body case 41 via a hinge 44 so as to be freely opened and closed. A flap 46 is provided in an inner portion of the clamper 43. The flap 46 is mounted to the clamper 43 in a state in which the flap 46 can rotate at a small angle around a turning shaft 47 as shown in FIG. 12. A direction of the turning shaft 47 coincides with a longitudinal direction of the damper 43. Clamping portions 48 and 48 each having a saw-tooth irregularity are provided in a leading end of the flap 46 and an inner surface of the main body case 41.

As shown in FIGS. 11 and 12, by passing a shoulder belt 111 and a lap belt 112 constituting the seat belt of the vehicle between the main body case 41 and the damper 43 in a state in which they are bundled, and lifting down the damper 43 in this state so as to close the lock 45 as shown in FIG. 9, the belts 111 and 112 are clamped between the clamping portions 48. When pulling up the shoulder belt 111 in a fastening direction (a direction of an arrow F), the flap 46 rotates in a direction of an arrow A in FIG. 12, and an interval between the clamping portions 48 is slightly widened, thereby allowing the belts 111 and 112 to move. However, when the shoulder belt 111 is going to move in a slacking direction (a direction of an arrow R), the flap 46 moves in a direction of narrowing the interval between the clamping portions 48, and the belts 111 and 112 are clamped between the clamping portions 48, where by the belt 111 is inhibited from being slacked. As mentioned above, the belt fixing apparatus 40 can clamp the belts 111 and 112 only in one direction. In this case, in the hinge 44 connecting the lock 45 to the main body case 41, there is assembled an open inhibiting device for inhibiting the clamper 43 from being opened due to a tension applied to the belts 111 and 112 by clamping the lock 45 at a closed position as shown in FIG. 9 by a suitable force. The open inhibiting device mentioned above can be constituted, for example, by utilizing a cam.

Figure 13:
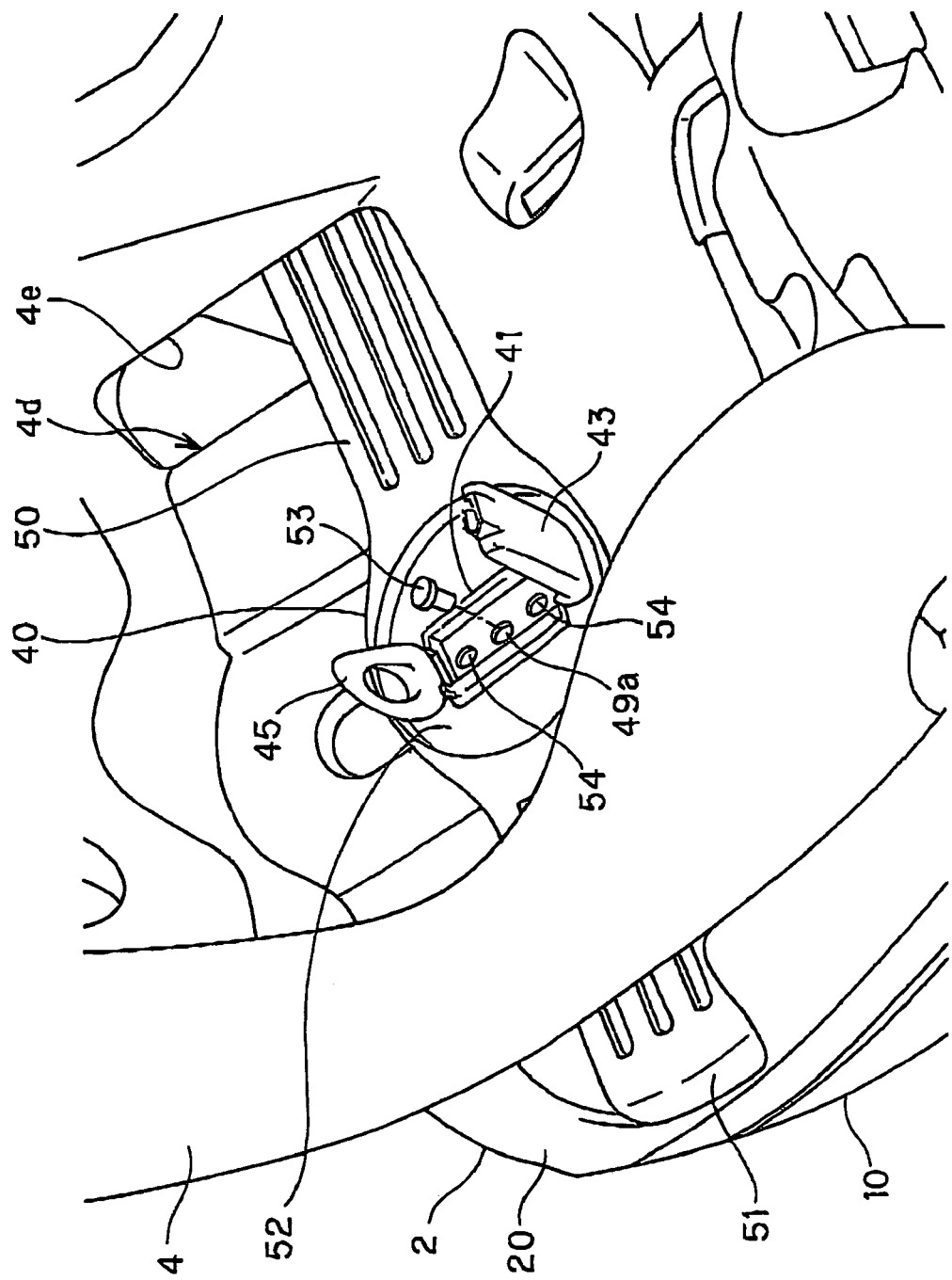
FIG. 13 is a view showing a portion near the belt fixing apparatus in an enlarged manner.

As shown in FIG. 11, a mounting hole 49a is formed in a center portion of the main body case 41 in a longitudinal direction, and positioning holes 49b and 49b are formed in both sides of the mounting hole 49a being symmetrical with respect to a center of the mounting hole 49a. As shown in FIG. 13, a circular shallow recess portion 52 is formed in a center of the bridge 50. The belt fixing apparatus 40 is mounted to the bridge 50 in a state in which the belt fixing apparatus 40 can rotate around a fixing screw 53, by arranging the main body case 41 of the belt fixing apparatus 40 in the recess portion 52, passing the fixing screw 53 through the mounting hole 49a, and screwing a leading end portion of the fixing screw 53 into the bridge 50 so as to fix. Accordingly, the belt fixing apparatus 40 is mounted to a center of the child car seat 1 in a lateral direction in a state in which the belt fixing apparatus 40 can be inverted in a vertical direction A bottom surface of the recess portion 52 is provided with a positioning protruding portion 54 which is fitted to the positioning hole 49b at a time when the main body case 41 is correctly mounted in a direction shown in FIG. 13. It is sufficient that the protruding portion 54 can position the direction of the main body case 41 of the belt fixing apparatus 40 to the position in FIG. 13 or a 180 degree rotated position, and a protruding height may be set slight. In this case, the main body case 41 is mounted to the bridge 50 by the fixing screw 53 while having such a margin that a necessary gap for the main body case 41 to rotate over the protruding portion 54 is secured between the main body case 41 and the bridge 50. Even if such a margin is provided, the main body case 41 is pressed against the bridge 50 by fastening the belts 111 and 112, so that there is no fear that the belt fixing apparatus 40 rotates with respect to the bridge 50 under using the child car seat 1.

Figure 14:
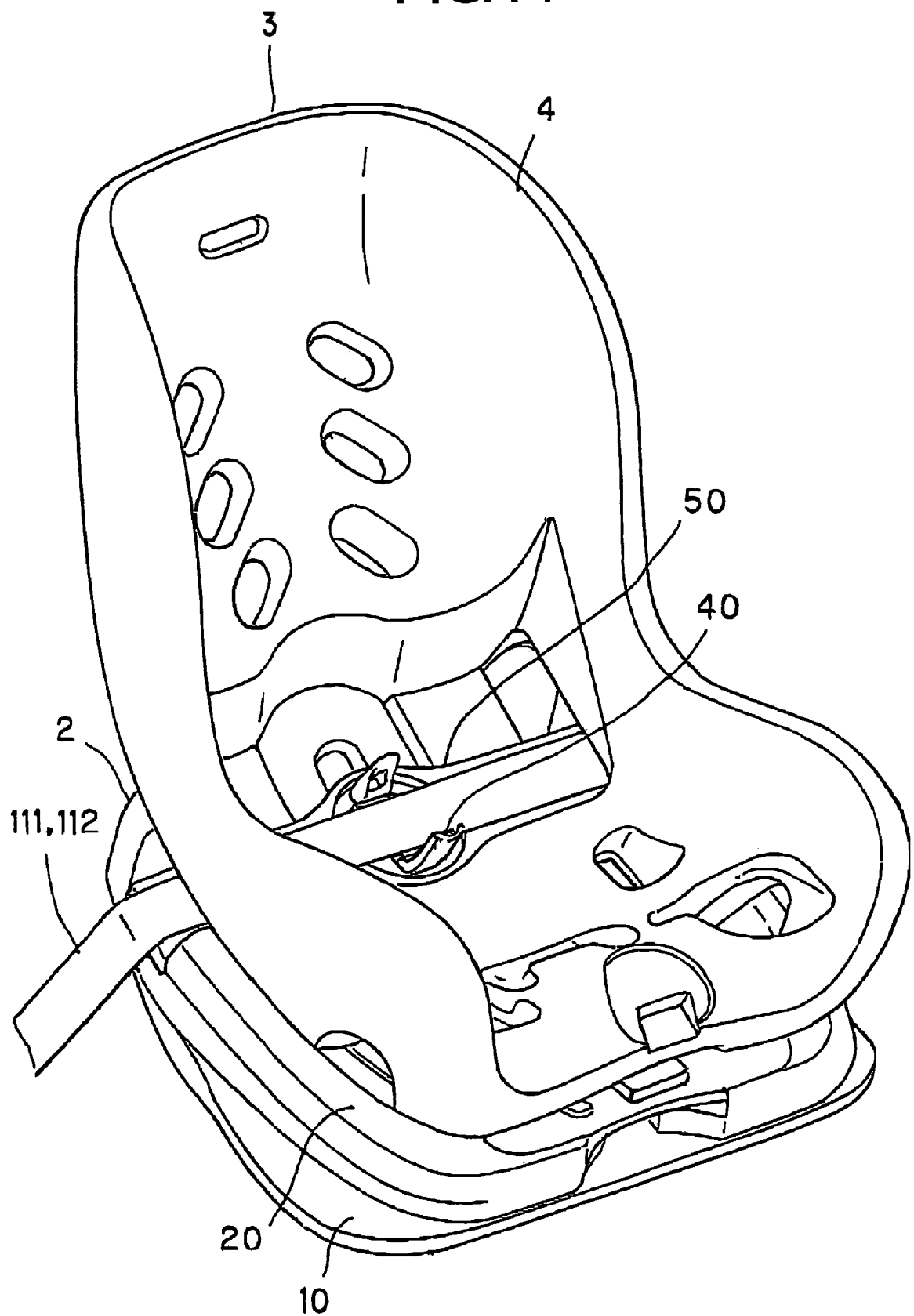
FIG. 14 is a perspective view showing a state in which a seat belt of a vehicle is passed through the belt fixing apparatus.
Figure 15:
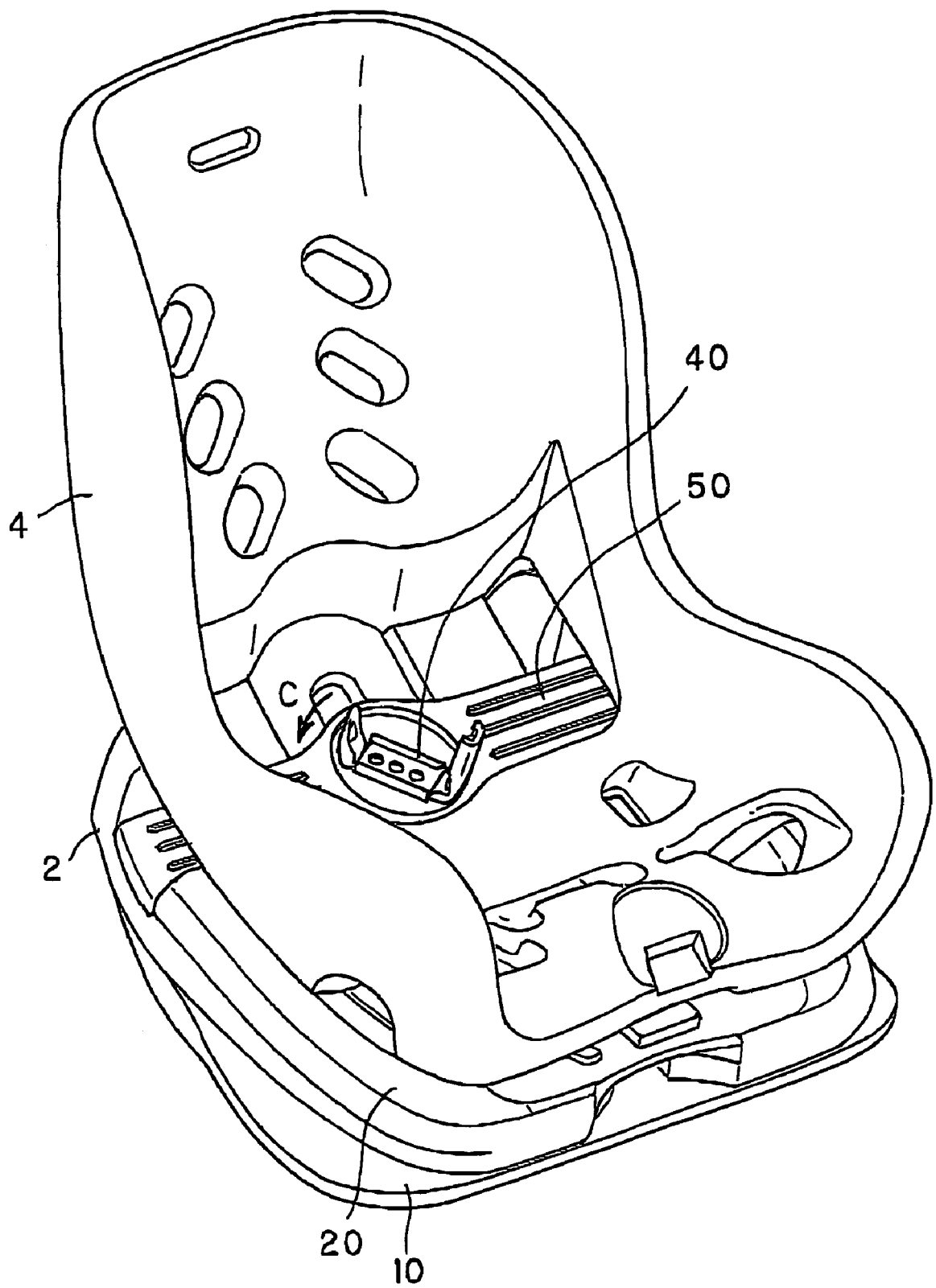
FIG. 15 is a perspective view showing a state in the process of changing the direction of the belt fixing apparatus.

In accordance with the child car seat 1 provided with the belt fixing apparatus 40 mentioned above, the base 2 can be firmly fixed to the seat 100 by passing the belts 111 and 112 through the belt fixing apparatus 40, sequentially closing the damper 43 and the lock 45, and pulling up the shoulder belt 111 in a fastening direction under this state, as shown in FIG. 14. In the case that the direction of fastening the shoulder belt 111 coincides with the direction in which the belt fixing apparatus 40 clamps the belts 111 and 112, the direction of loosening the shoulder belt 111 is brought into line with the direction in which the belt fixing apparatus 40 clamps the belts 111 and 112, by rotating the belt fixing apparatus 40 at 180 degrees on the bridge 50 as shown by an arrow C in FIG. 15, whereby the base 2 is fixed to the seat 100. After fixing the base 2 to the seat 100, the continuity of the surface of the shell 4 is secured by closing the recess portion 4d by a cover (not shown).

Figure 7B:
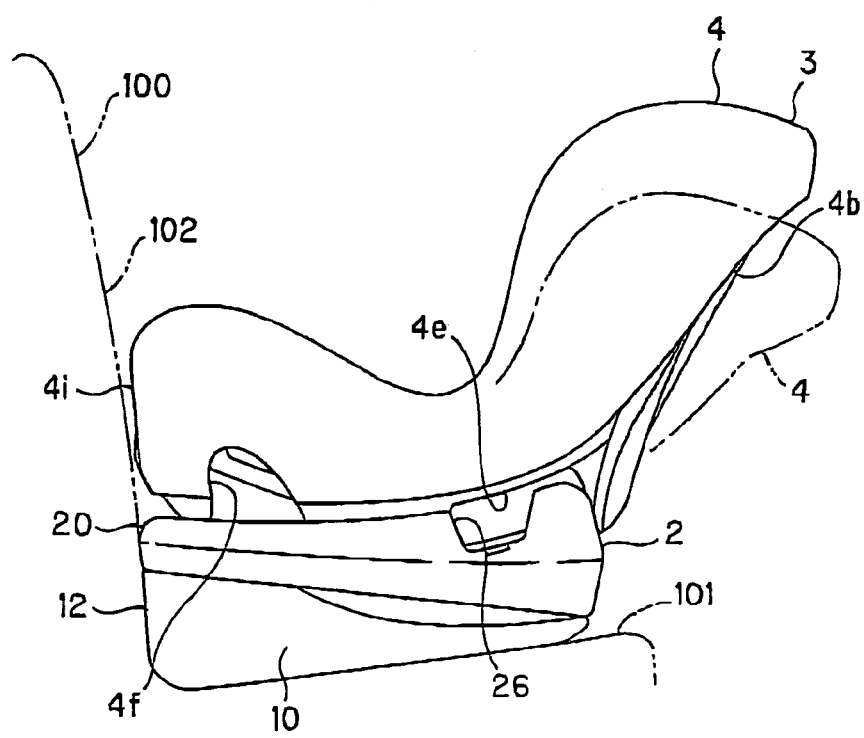

In this case, the fixing of the base 2 by the belt fixing apparatus 40 is effective only in the case that the shell 4 is mounted in the front-facing posture as shown in FIG. 7A. As shown in FIG. 7B, in the case that the shell 4 is mounted in the rear-facing posture, the shell 4 may be fixed to the seat 100 by utilizing a belt through hole 4f (refer to FIG. 1) provided in a front end portion of the side wall portion 4c of the shell 4.

The child car seat 1 in accordance with the embodiment mentioned above has the following advantages. First, since the base 2 is separated into the lower base portion 10 and the upper base portion 20, and the orientation of the seat main body 3 is inverted in the longitudinal direction by turning the upper base portion 20, it is sufficient that the reclining mechanism 30 is arranged between the base 2 and the shell 4. Accordingly, a restriction in view of design of the reclining mechanism 30 is small. It is possible to bring the lower base portion 10 and the upper base portion 20 into contact with each other in a wide range without being interfered by the reclining mechanism 30. Accordingly, even in the case that the seat main body 3 has a turnable structure, it is possible to sufficiently secure a supporting area between the fixed side and the movable side of the turning motion so as to improve the stability of the turning portion.

Since the structure is made such as to correspond to either of the cases that the shoulder belt 111 is fastened from the right and left sides, on the basis of the single belt fixing apparatus 40, it is possible to reduce the number of the belt fixing apparatus 40 so as to achieve a cost reduction.

Further, as shown in FIG. 8, in the child car seat 1 in accordance with the present embodiment, in order to improve an impact resistance at a time of a side collision, a head protecting portion 4g of the side wall portion 4c is formed so as to have such a depth that the head portion of a baby is approximately covered, and an arm rest portion 4h of the side wall portion 4c is formed so as to be higher toward a front end 4i of the shell 4, whereby knees of the baby are approximately covered.

Further, as shown in FIG. 7B, in the case that the shell 4 is mounted in the rear-facing posture, the front end 4i of the shell 4 is positioned approximately on an extension of the rear end 12 of the lower base portion 10. In this case, FIG. 7B shows a state in which the inclination of the shell 4 is set at approximately center of an adjusting range by the reclining mechanism 30. In the case that the front end 4i of the shell 4 is aligned with the rear end 12 of the base 2, the contact range of the child car seat 1 with the seat back 102 is expanded, whereby the stability of the child car seat 1 is improved. In particular, since the arm rest portion 4h is higher toward the front end 4i, it is possible to increase a contact length between the front end 4i and the seat back 102, and it is possible to achieve a high safety on the basis of a synergetic effect.

The present invention is not limited to the embodiment mentioned above, and can be carried out in accordance with various aspects with in the technical scope of the invention. For example, the mounting structure of the belt fixing apparatus in accordance with the present invention can be applied to a child car seat in which the turning mechanism of the seat main body and the reclining mechanism are not provided, and the base and the frame serving as the seat supporting portion are integrally formed with the seat main body.

The child car seat in accordance with the present invention includes a so-called baby seat intended for a newborn infant and an infant within its category. A description will be given of an embodiment in which the mounting structure of the belt fixing apparatus in accordance with the present invention is applied to the baby seat, with reference to FIGS. 16 and 17.

Figure 16:
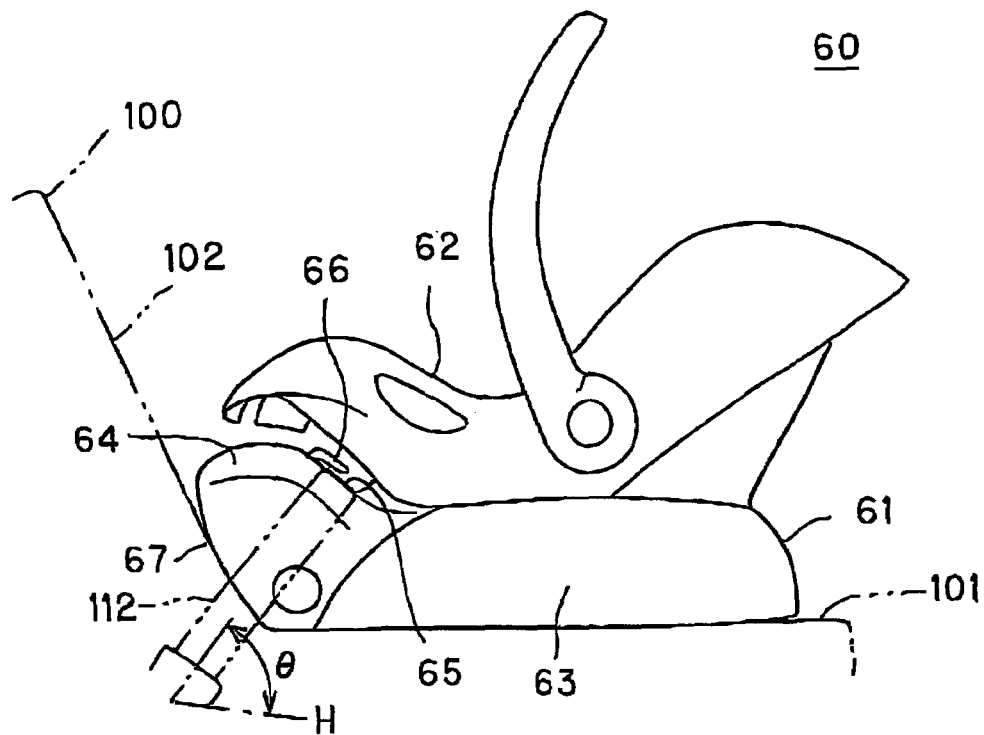
FIG. 16 is a view showing an embodiment of a baby seat in which the seat main body is set detachable with respect to the base.
Figure 17:
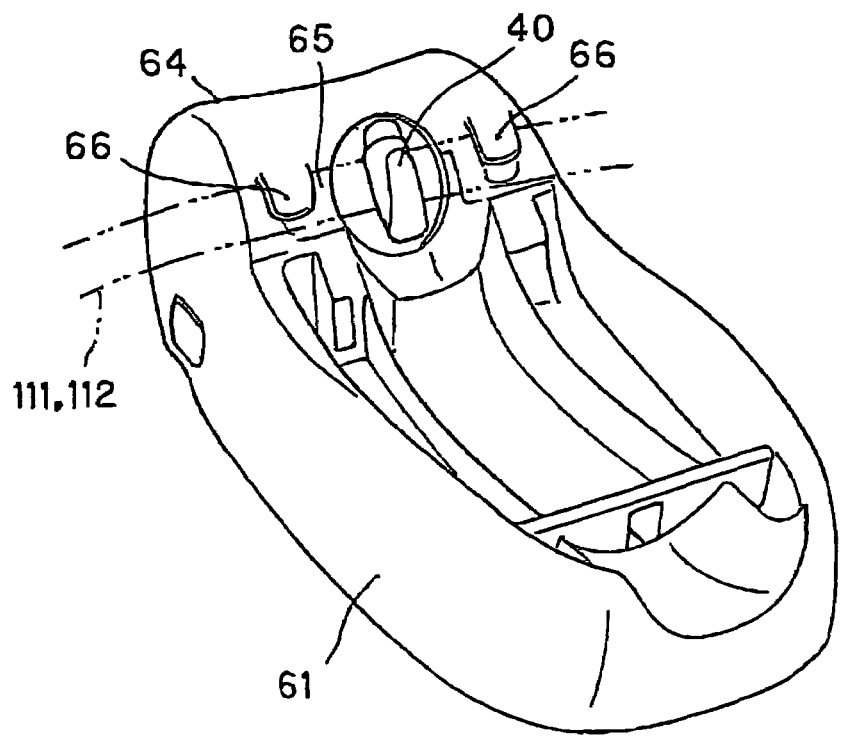
FIG. 17 is a perspective view of the base of the baby seat.

In a baby seat 60 shown in FIG. 16, a seat main body 62 is detached from a base 61 and can be used as a carry. As shown in FIG. 17, an expanded portion 64 protruding upward from a mounting portion 63 to the seat main body 62 is formed in one end side of the base 61. An inclined surface in the middle of the expanded portion 64 is used as a belt mounting surface 65, and the belt fixing apparatus 40 is rotatably mounted to a center of the belt mounting surface 65 in a lateral direction. The belt mounting surface 65 is covered by the seat main body 62 at a time when the seat main body 62 is attached, and is invisible, however, becomes visible by detaching the seat main body 62 from the base 61, thereby being operable. In this case, a connection structure between the belt fixing apparatus 40 and the base 61 may be the same as that of the embodiment shown in FIG. 13.

Further, hooks 66 and 66 for preventing the seat belts 111 and 112 from being displaced upward are formed in both sides of the belt fixing apparatus 40. As shown in FIG. 16, an inclination of the belt mounting surface 65 is adjusted such that an angle θ of the lap belt 112 hooked to the belt mounting surface 65 with respect to a horizontal surface H becomes approximately 45 degrees, at a time when the baby seat 60 is mounted to the seat 100 in such a manner that the seat main body 62 is set in the rear-facing posture. Further, a rear end 67 of the expanded portion 64 is struck against the seat back 102. Since the expanded portion 64 is provided and is struck against the seat back 102 as mentioned above, it is possible to expand the contact range between the baby seat 60 and the seat back 102 in the vertical direction so as to improve the stability of the baby seat 60.

In addition to the structure mentioned above, the mounting structure of the belt fixing apparatus in accordance with the present invention can be applied to various child car seats having various kinds of structures.

What is claimed is:

1. A child car seat comprising:
  a base provided with a lower base portion to be mounted on a seat vehicle, and with an upper base portion mounted, via a connection, to the lower base portion so that the upper base portion rotates with respect to the lower base portion, the connection connecting the upper and lower base portions so that the upper base portion is repositionable with respect to the lower base portion from a first position where the upper base is facing a first direction to a second position where the upper base is facing a second direction 180 degrees opposite the first direction such a manner that repositioning the upper base portion from the first position to the second position reverses an orientation of the upper base portion with respect to the lower base portion and, when the base is mounted on the seat of the vehicle, a longitudinal direction of the vehicle; and
  a seat main body supported by the base,
  the upper base portion of the base having an upper surface, and
  the seat main body being mounted on the upper surface of the upper base portion via a reclining mechanism, wherein,
  the seat main body has a shell which is connected to the upper base portion via the reclining mechanism,
  the base is provided with a bridge which covers at least a portion of the shell and is astride the shell in a lateral direction while allowing a reclining motion of the shell respect to the upper base portion and which the bridge has both ends fixed to the upper base portion, and which the bridge includes a belt fixing apparatus for fixing a seat belt of the vehicle to the base is mounted to the bridge.

2. A child car seat comprising:
  a base; and
  a seat main body supported by the base,
  the base provided with a lower base portion to be mounted on a seat of a vehicle, the lower base portion connected to an upper base portion so that the upper base portion rotates with respect to the lower base portion, the upper base portion repositionable with respect to the lower base portion from a first position where the upper base is facing a first direction to a second position where the upper base is facing an opposite second direction in such a manner repositioning the upper base portion from the first position to the second position reverses an orientation of the upper base portion with respect to the lower base portion and, when the base is mounted on the seat of the vehicle, a longitudinal direction of the vehicle,
  the base having an upper surface to which the seat main body is mounted, and
  wherein the upper base portion is provided with a belt mounting portion for fixing the upper base portion to the seat of the vehicle by the seat belt of the vehicle.

3. The child car seat according to claim 2, wherein the belt mounting portion is provided with a belt fixing apparatus for fixing the seat belt to the base.

4. A child car seat comprising:
seat supporting portion to be clamped on a seat of a vehicle by a seat belt of the vehicle; and
a belt fixing apparatus mounted to the seat supporting portion, allowing the seat belt inserted to an inner portion thereof to move in one direction and inhibiting seat belt from moving to an opposite direction to the one direction,
wherein the belt fixing apparatus is rotatably mounted to the seat supporting portion from a first position where the belt fixing apparatus is facing a first direction to a second position where the belt fixing apparatus is facing an opposite second direction.

5. The child car seat according to claim 4, comprising a base provided as the seat supporting portion, and a shell provided so as to cover the base and mounted to the base in a state in which a reclining motion with respect to the base is possible,
wherein a bridge arranged so as to be astride the shell in a lateral direction from a front surface side while allowing a reclining motion of the shell and having both ends fixed to the base through the shell is provided on the base, and
the belt fixing apparatus is mounted on the bridge.

6. The child car seat according to claim 5, wherein a recess portion is provided in the front surface side of the shell, and the bridge and the belt fixing apparatus are received in the recess portion.

7. The child car seat according to claim 4, wherein the child car seat is provided a base provided as the seat supporting portion, and a seat main body provided as to be detachable with respect to the base, and the belt fixing apparatus is mounted to the portion of the base covered by the seat main body.

8. The child car seat according to claim 4, wherein the belt fixing apparatus is arranged in a center with respect to the lateral direction.

* * * * *